May 27, 1930.  A. D. RICCIA  1,760,777
ELECTRIC INSTALLATION IN COMBINATION WITH PRESSURE SPLITTING DEVICE
Original Filed Dec. 2, 1921  2 Sheets-Sheet 1
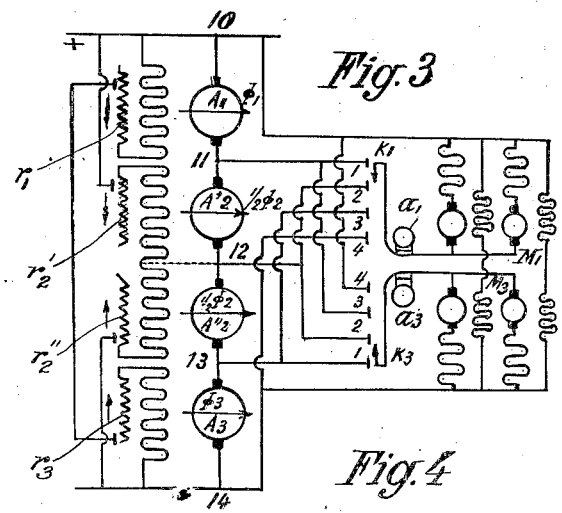
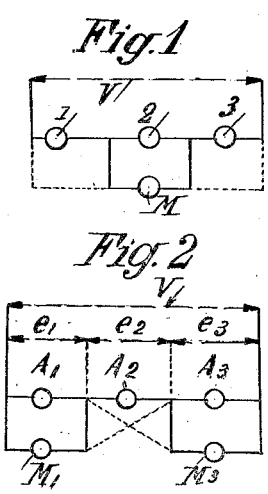
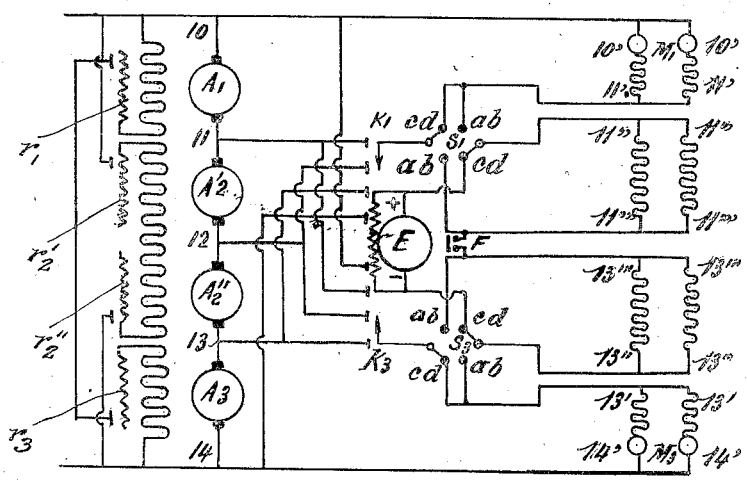
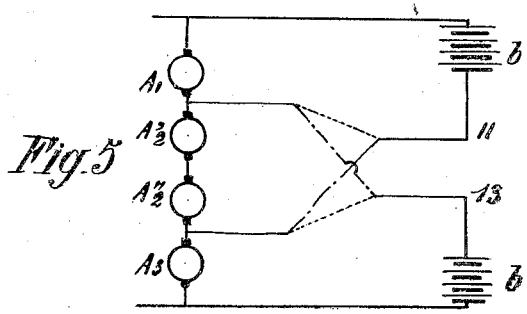
Inventor:
Angelo Della Riccia May 27, 1930.　　　　　A. D. RICCIA　　　　　1,760,777
ELECTRIC INSTALLATION IN COMBINATION WITH PRESSURE SPLITTING DEVICE
Original Filed Dec. 2, 1921　　2 Sheets-Sheet 2

Inventor:
Angelo Della Riccia
By Langner, Parry, Card Thompson
Attys.

Patented May 27, 1930

1,760,777

UNITED STATES PATENT OFFICE

ANGELO DELLA RICCIA, OF BRUSSELS, BELGIUM

ELECTRIC INSTALLATION IN COMBINATION WITH PRESSURE-SPLITTING DEVICE

Original application filed December 2, 1921, Serial No. 519,558, and in France December 16, 1920. Divided and this application filed August 12, 1927. Serial No. 212,570.

The invention relates to the use of a direct current pressure splitting device or transformer for the supplying of electric current of variable pressure to electric apparatus such as motors for traction, hoisting, etc., motors for rolling mills, storage batteries, etc., from a main power line at a substantially constant pressure. In the case of applying the device to the regulating of the supply of motors for traction, hoisting, or the like, the losses of energy in starting resistances or in mechanical brakes on descents and on stops, are avoided, and a regeneration of energy takes place on descent.

Said pressure splitting device provides for the division of the main line pressure V into different parts, all of which are at will continually variable; the use of gradually increasing or decreasing pressures upon the electric apparatus, produces a reduction of losses during the operation of said apparatus, while at the same time, the use of connections allowing the electric energy to proceed as much as possible directly from the main line to said apparatus, and thus to reduce as far as possible, the use of the transformer elements (armature or their parts) allows a reduction in size and weight of and in said elements. The pressure splitting device may on the other hand fulfill various secondary functions of a useful nature, such as the driving at suitable speed of exciters or other auxiliary apparatus which may be necessary to carry the invention properly into effect.

According to the invention, the pressure splitting device which is provided is the device described in the application Ser. No. 519,558, filed Dec. 2, 1921, whereof the present case is a divisional application. Said pressure splitting device thus comprises as described in said application Ser. No. 519,558, four armatures or armature parts mounted on the same shaft and connected in series between the two terminals of the main distributing line, the two end armature windings being equal and arranged in a symmetrical manner with respect to the two terminals of the line and the two intermediate armature windings being also equal and arranged in a symmetrical manner with respect to the same, and respective fields for all said windings, with means, known per se, to vary at will equally the fluxes through the two end armature windings and to also vary at will equally, but in another manner as in the end windings, the fluxes through the two intermediate armature windings.

For applying said device to the regulating of the supply of electrical apparatus, these apparatus are subdivided into two equal separate groups the outer terminals of which are permanently connected to the outer terminals of the transformer while their inner terminals are connected to variable points between the armatures or armature parts of the transformer according to the phase of the operation. When applied to the regulating of the supply of traction or hoisting motors, the motors of each of the two separate groups sometimes are connected in shunt with one of the respective armatures or armature parts, and sometimes in shunt with the whole of the said end armatures or armature parts and the entire intermediate portion, the motors then acting either as motors or as generators.

The sum of the partial fluxes in the four armatures or armature parts may be, if desired, approximately constant; in this case, the pressure splitting device, as a whole, may constitute a motor adapted to drive, at a substantially constant speed, an auxiliary apparatus such as an independent exciter serving to excite the motors, when these are constructed as series motors, thus converting the same into separate excited motors with or without compound series winding, so as to provide for regeneration during descent or braking.

The middle armatures or armature parts in some cases are preferably joined to form a single armature or armature part.

In the drawings forming a part hereof:

Fig. 1 is a diagram of a known arrangement comprising a transformer with three armatures supplying a working apparatus or group of apparatus.

Fig. 2 is a diagram of the arrangement according to my invention, comprising a pressure splitting device with three symmetrically disposed armatures traversed by fluxes varying symmetrically, and supplying groups of working apparatus whose distribution is also symmetrical.

Fig. 3 shows the general arrangement of a pressure splitting device with four armature parts or sections, the connections being modified at will by symmetrical switches $K_1 K_3$.

Fig. 4 shows the general arrangement of a plant comprising an independent exciter mounted on the shaft of the device and serving to excite the working motors.

Fig. 5 shows the application to the charging or discharging of a storage battery.

Figure 6:
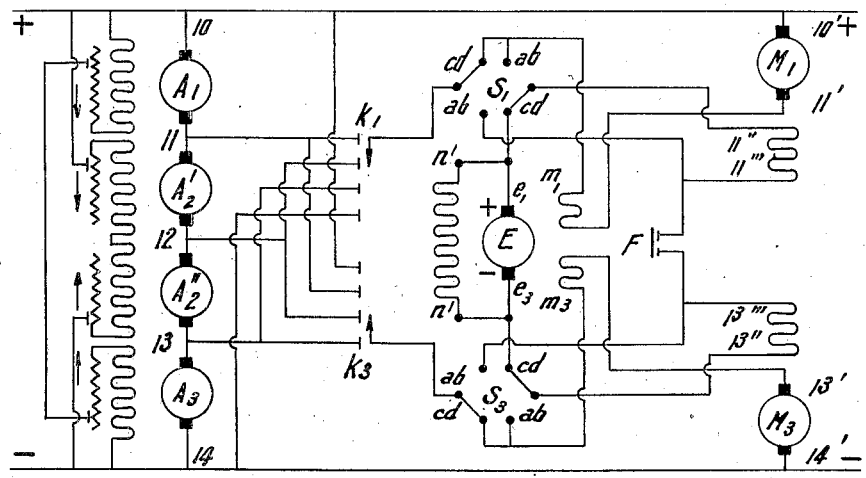
Fig. 6 shows another form of the general arrangement with an exciter energized by compound windings.

The device comprises four armatures or armature parts $A_1, A'_2, A''_2, A_3$ mounted on a common shaft and placed in series, in the indicated order, between the terminals of the main line, at the substantially constant pressure V; these four armatures or armature parts being subjected to the action of two fields or of a field divided into two or three parts producing two equal magnetic fluxes (or a single flux through $A_1$ and $A_3$, and two other fluxes through $A'_2$ and $A''_2$, so that $A_1$ shall produce at each instant the same pressure as $A_3$, and that if $A'_2$ is separate from $A''_2$, the part $A'_2$ will produce the same pressure as $A''_2$.

It is however remembered that as explained in the patent application above mentioned the two intermediate parts $A'_2 A''_2$ may be combined in a single armature part $A_2$.

The working apparatus, such as motors or battery, which are to be regulated, are divided into two equal groups $M_1$ and $M_3$, the end terminals of which are permanently connected with the terminals of the main line while their intermediate terminals are variably connected with two terminals situated between $A_1$ and $A'_2$ and between $A''_2$ and $A_3$; direct connections are used whereby the apparatus $M_1$ can be subjected to the pressure of $A_1$, and the apparatus $M_3$ to the pressure of $A_3$; crossed connections are used whereby the apparatus $M_1$ are subjected to the combined pressure of $A_1, A'_2$ and $A''_2$ and the apparatus $M_3$ to the combined pressure of $A' A''_2$ and $A_3$. The two groups $M_1 M_3$ are thus in all cases subjected to two equal pressures, but these are taken from two separate and symmetrical parts of the transformer. This distinction and this symmetrical disposition constitute together with the permanency of the connection between the end terminals of the two groups $M_1 M_3$ and the terminals of the main line, the factors causing the exceptional economy of my present system of regulation, as compared to all other systems of like nature.

When the fluxes respectively passing through the elements $A_1$ and $A_3$ and the elements $A'_2$ and $A''_2$ are so regulated that the sum of all the fluxes is substantially constant, the device, as a whole, may be employed as a motor at a substantially constant speed, for driving an auxiliary apparatus, more particularly an exciter for the motors. In particular, a such arrangement may be used for transforming series-motors into separately excited motors with compound arrangement represented by a part of the series winding, or without any such compound winding, if this excitation is replaced as a whole. With this disposition, one may employ motors designed for traction, hoisting, or like purposes which are normally series-excited motors as generators which will offer a recuperation of energy on down-grades and upon braking.

In order to assist in the explanation of the invention, reference will now be made to Figures 1 and 2 of the accompanying drawings which illustrate simple diagrams for use in explaining the principle on which the invention is based.

It is recognized that if it is desired to supply working motors M at a voltage varying between O and V, a converter of the motor-generator type may be used having two armatures, motor and generator, in series at the voltage V, the generator armature supplying a voltage $e_1$ varying from O to V, and the motor armature working at a voltage $e_2$ varying from V to O; $e_1 + e_2 = V$.

Another method would be to use a transformer (Fig. 1) consisting of two end armatures 1 and 3 and an intermediate armature 2 interposed between 1 and 3, the voltage $e_2$ being subdivided between the two end armatures. In such a case, however, the current could not be supplied to the operation motor M without passing through the two end armatures 1 and 3 of the transformer.

The invention relates to an improved arrangement of a transforming device of this character, which is of a more economical nature, as it enables a part of the energy of the main distribution circuit to pass directly to the motors (Fig. 2), and it also enables the recovery of energy by the said motors during descent or reduction of speed by braking, said motors possessing or being provided for this purpose with an excitation enabling their operation as generators in a reliable manner.

In order to enable a part of the energy to pass directly from the main distribution line into the working motors M according to the invention, the said motors are constructed with two separate windings and two commutators each, or are subdivided into two separate groups $M_1 M_3$, as Fig. 2 (each group consisting of a single motor of a number of motors); and I provide a pressure splitting device, of which the armature is divided into four armatures or armature parts $A_1$ $A'_2$ $A''_2$ $A_3$ (of which $A'_2$ $A''_2$ may be joined together to form a single armature or armature part $A_2$), means are also provided for connecting each group of motors $M_1$ $M_3$, firstly, in shunt respectively with the armatures or armature parts $A_1$ or $A_3$, secondly in shunt respectively with the whole of the armatures or armature parts $A_1$ $A_3$ and the intermediate armature or armature part $A_2$, viz. $A_1 + A_2$ or $A_2 + A_3$; in such a manner that a part of the current pass directly from the main line to the two groups of motors $M_1$ and $M_3$ or vice-versa without traversing the parts $A_1$ and $A_3$ of the device. For this reason, the system is advantageous in that it is highly economical.

In order to effect a regeneration of energy, the motors, if excited in series, are converted into separately excited motors, with or without a compound series winding, by means of an independent exciter which should operate as far as possible at constant speed. According to the invention, the pressure splitting device may be so arranged that the sum of the variable partial fluxes in the different armatures or parts of the armatures $A_1$ $A_2$ $A_3$ will be practically constant, and consequently the whole arrangement, when employed at practically constant voltage of the main line, may constitute in itself a motor at practically constant speed for the independent exciter.

Referring now to Fig. 3 (where the motors are represented as compound wound motors), and to Fig. 4 (where the motors are represented as series wound motors with their field windings cut into two portions, as it will be explained further), the central armature $A_2$ of the machine (or the middle part A of the armature) is assumed to be divided into two parts $A'_2$ $A''_2$ for the sake of clearness. On a common shaft are mounted four armatures or armature parts $A_1$ $A'_2$ $A''_2$ $A_3$ connected together in series (with all the E. M. F.'s added arithmetically), these armatures or armature parts being supplied with the distribution line voltage V which is assumed to be constant.

In the following description (which applies more particularly to Fig. 4) it is assumed that the two groups of motors $M_1$ $M_3$ are of a similar nature, then it must be $e_1 = e_3$, this being obtained by regulation so that flux $\phi_1 = \phi_3$. It will also be assumed that $\phi'_2 = \phi''_2$.

With such an arrangement, the operation will be as follows. Let $i$ represent the current in each group of motors $M_1$ or $M_3$, $i_1 = i_3$ the current in the armatures $A_1$ and $A_3$, and $i'_2 = i''_2$ the current in the armatures $A'_2$ and $A''_2$.

(a) First period of starting.

The motors $M_1$ and $M_3$ are switched into the circuit by placing switches $K_1$ and $K_3$ upon contacts 1 and 1, the double two way switches $S_1$ and $S_3$ closing the four openings $ab$ and switch F is open. The motors $M_1$ and $M_3$, including field portions $11''$—$11'''$ and $13''$—$13'''$, are thus connected in shunt with the end armatures $A_1$ and $A_3$, respectively, from points 10 to 11 and from points 13 to 14.

In order to provide a first minimum starting value of the fluxes $\phi_1$ $\phi_3$ the rheostats $r_1$ $r_3$ by means of which said fluxes $\phi_1$ $\phi_3$ (which are equal in respect of each other) are regulated, are first placed on the first contact, while $r'_2$ and $r''_2$ contrarily are placed so as to provide the maximum value of $\phi'_2$ and $\phi''_2$. The equal fluxes $\phi_1$ $\phi_3$ subsequently are increased, or the equal fluxes $\phi'_2$ and $\phi''_2$ are decreased to supply to the motors $M_1$ and $M_3$ the two E. M. F. $e_1$ and $e_3$ which are always equal and greater than their proper counter E. M. F. Parts $A_1$ and $A_3$ of the pressure splitting device act as generators and parts $A'_2$ and $A''_2$ as motors, the power circuit supplying to the motors $M_1$ and $M_3$ and the transforming device a current which (neglecting the currents $i_0$ representing transformer losses) is equal to the difference between $i_1$ and $i$, and power which increases from zero to $Vi$, each motor or group of motors $M_1$ and $M_3$ absorbing power which increases from zero to $\frac{Vi}{2}$. At the end of this period, the two groups of motors may be connected in series with each other by placing switch contacts $K_1$ and $K_3$ on contacts 2 and 2 which lead to the middle point 12 of the transforming device.

(b) Second period of starting.

The switches $K_1$ and $K_3$ are placed upon contacts 3 and 3, so that the motor group $M_1$ is connected between points 10 and 13, and the group $M_3$ between points 11 and 14. The equal fluxes $\phi_1$ and $\phi_3$, are decreased; or the equal fluxes $\phi'_2$ and $\phi''_2$ are increased, so that the motor groups will still be supplied with equal E. M. F.'s $e_1 + e'_2 + e''_2$ and $e'_2 + e''_2 + e_3$ which are always greater than their proper counter E. M. F.'s. Parts $A_1$ and $A_3$ of the pressure splitting device now act as motors and parts $A'_2$ and $A''_2$ as generators, the power circuit supplying power which increases from $Vi$ to $2Vi$ and each of the motor groups $M_1$ and $M_3$ absorbing power which increases from $\frac{Vi}{2}$ to $Vi$. At the end of this operation, which completes the starting period, the motor groups $M_1$ and $M_3$ may be connected in parallel by placing switches $K_1$ and $K_3$ on contacts 4 and 4, each being thus connected to the power circuit between points 10 and 14. From this moment the motors $M_1$ and $M_3$ operate according to their characteristics at the voltage V.

The motors of the groups $M_1$ and $M_3$, being series wound motors, with their field windings cut in two parts $10'$—$11'$ and $11''$—$11'''$ for the motors of group $M_1$, and $14'$—$13'$ and 13″—13‴ for the motors of group $M_3$, are suitably excited by the auxiliary exciter E mounted on the shaft of the pressure splitting device, to enable them to operate reliably as generators and would thus be capable (in addition to the braking effect which they might produce in parallel in accordance with their characteristics at constant voltage V) of producing a braking effect according to the two following periods.

(c) First braking period.

The switches $K_1$ and $K_3$ are placed on contacts 3 and 3 switches $S_1$ and $S_3$ the double two way closing the four opening $cd$, and switch F is closed. The motors of groups $M_1$ and $M_3$ are thus with their permanently connected field portions 10′—11′ and 14′—13′, connected between points 10 and 13 and points 11 and 14, respectively, while the field portions 11″—11‴ and 13″—13‴ are connected in series with each other and with the exciter E. The equal fluxes $\phi_1$ and $\phi_3$ are increased, or the equal fluxes $\phi'_2$ and $\phi''_2$ are decreased, so as to supply to the motors of groups $M_1$ and $M_3$, now acting as generators, two counter E. M. F.'s $e_1 + e'_2 + e''_2$ and $e'_2 + e''_2 + e_3$ which are always equal and somewhat below their proper E. M. F.

During the starting periods and normal working, the field winding portions 10′—11′ and 11″—11‴, and likewise parts 14′—13′ and 13″—13‴, were acted upon by the same magnetizing current (the current taken by the motor). During the braking periods, on the contrary, the field winding portions 10′—11′ and 14′—13′ are acted upon by a demagnetizing current (the current supplied by the motors acting as generators) while the portions 11″—11‴ and 13″—13‴, are acted upon by the magnetizing current supplied by exciter E which is driven by the transforming device.

The action, as a whole, is similar to that which takes place during the second period of starting, except that the fluxes change in the opposite direction, that part of the field windings of the motors $M_1$ and $M_3$ are differentially excited, and that $i_0$ is greater by reason of the added losses in the auxiliary exciter E. At the end of the period the switches $K_1$ and $K_3$, may be moved to contacts 2 and 2.

(d) Second braking period.

Switches $K_1$ and $K_3$ are placed on contacts 1 and 1; the other switches being left in the positions shown in the drawings, that is, the positions described for the first braking period. The motor groups $M_1$ and $M_3$ are thus connected between points 10 and 11 and points 13 and 14, respectively; and the equal fluxes $\phi_1$ and $\phi_3$ are decreased, or the equal fluxes $\phi'_2$ and $\phi''_2$ are increased so as to supply to the groups of motors $M_1$ and $M_3$ which are now acting as generators, two counter E. M. F.'s $e_1$ and $e_3$ which are always equal and somewhat less than their proper E. M. F.

The action, as a whole, is similar to that which takes place during the first period of starting except for the differences which have been indicated above.

At the end of this period the regulating rheostats $r_1$ $r_3$ consequently are returned on their first contact corresponding to the minimum positive valve of the fluxes $\phi_1$ $\phi_3$ (minimum starting value of said fluxes).

During the starting, the current $i$ is regulated by controlling, by means of the transforming device, the excess of voltage supplied to the motors of groups $M_1$ and $M_3$ in relation to the counter E. M. F. which they produce at the instant speed. During the braking, the regulation is carried out in a similar manner by adjusting the lack of voltage supplied to the motors in relation to their E. M. F. The motors may be started and braked at constant current, or with variable current, as may be desired.

Each of four windings $A_1$ $A'_2$ $A''_2$ $A_3$ will alternately absorb and supply a maximum power $\frac{1}{8} Vi$ and an average power $\frac{1}{12} Vi$; the group of four windings thus corresponds to a temporary maximum power $\frac{1}{2} Vi$ which is equal to one-fourth the power of the motors which are supplied with current, the average power of the group during the intermediate periods to $\frac{1}{3} Vi$ which equals one-sixth of the power of the motors supplied with current. Moreover, all the machines have a voltage $\frac{1}{2} V$ instead of voltage V, which is an important advantage for small machines.

The left of Figs. 3 and 4 shows four slides and four resistances in series with the four fields. In the same figure $a^1$ and $a^3$ are two ammeters.

The four positions of the switches $k_1$ $k_3$ correspond to the following connections: position (1) to the periods (a) and (d) when each group of motors is in shunt with one end portion and in series with the intermediate and the other end portion of the pressure splitting device; position (2) to the operation of the two groups of motors in series without including any portion of the pressure splitting device in series therewith; position (3) to the periods (b) and (c) when each group of motors is in shunt with one end and the intermediate portions and in series with the other end portion of the pressure splitting device; position (4) to the operation of the two groups of motors in parallel without including any portion of the pressure splitting device in series therewith.

I will here better explain the functioning of the series wound motors with auxiliary field windings. As shown in Fig. 4, the armatures of the two groups of motors $M_1$ $M_3$ are directly connected to the points 10 and 14 of the regulating machine or group. Subsequent to these armatures are disposed the field windings 10′, 11‴ and 14′ 13‴ whose ends 14‴ and 13‴ should be connected with the points 11 and 13 respectively of the machine or group during the period (*a*) and with the points 13 and 11 during the period (*b*). Each of these field windings is divided into two parts 10′ 11′ and 11″ 11‴, or 14′ 13′ and 13″ 13‴. The parts 10′ 11′ and 14′ 13′ are connected with the armature in a permanent manner and are acted upon by the magnetizing current during the starting and the normal working (the current taken by the motors), and by a demagnetizing current during the braking and the operation or regeneration (the current supplied by the motors). The parts 11′, 11‴ and 13″ 13‴ are connected during the starting and in normal operation with the parts 10′ 11′ and 14′ 13′ and receive the same magnetizing current as the latter. During the braking and the recuperation on the contrary, they are disconnected from the preceding and connected with a small exciter E driven by the machine or by the group and supplying a special magnetizing current to the fields of the motors $M_1$ $M_3$.

Figure 7:
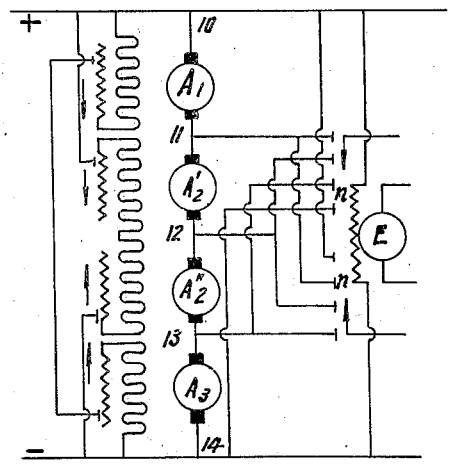
Figs. 7 and 8 show other forms with an exciter energized by independent windings.
Figure 8:
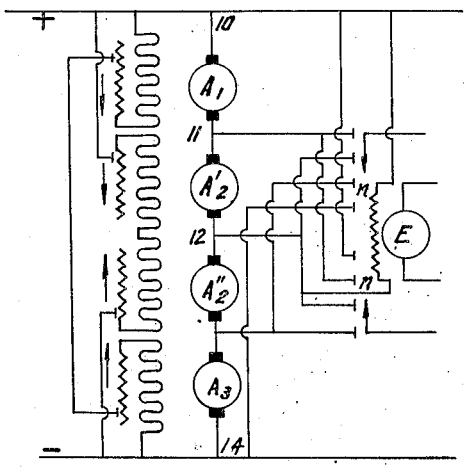

Said exciter may be energized either by a shunt field or by an independent field. The Figures 7 and 8 show two independent excitations, the field winding *n n* being connected (Fig. 7) across points 10 and 14 that is under a pressure V, or (Fig. 8) across the points 10 and 12 that is under a pressure $\frac{V}{2}$. It is understood of course that the same pressure can be attained by connecting the field across the points 12 and 14.

In the case of series wound motors with field windings cut in two parts, eight general conductors are used, two whereof proceed to the two groups of motor armatures and six are brought respectively from all the points 11′ 11″ 11‴ 13‴ 13″ 13′, in order to carry out all the required control operations. As regards apparatus, the following are required: two double two way switches $S_1$ and $S_3$ one of which for respectively connecting the four-point switches $K_1$ $K_3$ either with the conductors brought from the terminals 11‴ and 13‴ during the period (*a*) and (*b*) or with the conductors brought from the terminals 11′ and 13′ during the periods (*c*) and (*d*); and one of the same for respectively connecting the two conductors brought from the terminals 11″ and 13″, either with the conductors brought from the terminals 11′ and 13′ during the periods (*a*) and (*b*), or with the positive and negative terminals of the auxiliary exciter E during the periods (*c*) and (*d*); and a simple switch F for connecting the conductor brought from the terminals 11‴ with the conductor brought from the terminals 13‴ during the periods (*c*) and (*d*) and for braking this connection during the periods (*a*) and (*b*). These five apparatus may on the other hand be combined in a single device with two positions, one for the starting and the other for the braking.

It is easily understood that instead of using compound wound motors it is possible to use a compound wound exciter E, the compound windings of this exciter being fed by the current of the motors in such manner that when starting and during normal operation, said exciter is acted upon by a magnetizing current, i. e. by the current taken by the motors, while during braking and regeneration it is acted upon by a demagnetizing current, i. e. by the current supplied by the motors.

Fig. 6 shows such a device in which the exciter E is provided with a shunt winding *n′ n′* (or an independent excitation winding fed at pressure V or $\frac{V}{2}$ as shown in Figs. 7 and 8) and with compound windings $m_1$ and $m_3$ fed by the current of the motors $M_1$ and $M_3$.

The pressure splitting devices according to the invention may also be used for the complete charging and discharging of a storage battery inserted in a line working at constant tension. Fig. 5 shows a diagram of connections for this purpose.

The battery is divided into two equal parts *b b″* which are mounted between the line and the points 11, 13, of the armature of the machine. In the case of a line at 210 volts and a battery of 100 cells, the battery may be charged, using the cross connections shown in dash and dotted lines, by supplying to each half of the battery 700 amperes at 135 volts, which would require 900 amperes from the line, the middle part of the armature $A'_2$ $A''_2$ acting as negative booster for the battery; and on the other hand, the battery may be discharged, using the direct connections shown in dotted lines, by taking from each half of the battery 1050 amperes at 90 volts and supplying 900 amperes to the line, the middle parts $A'_2$ $A''_2$ acting as booster for the battery.

What I claim is:

1. In combination with a main distributing line of substantially constant pressure,—a direct current pressure splitting device with two extreme and at least two intermediate symmetrical terminals, with means symmetrically disposed to vary the pressures at the intermediate terminals with respect to the pressures applied to the extreme terminals of said pressure splitting device,—and two balanced groups of electric apparatus to be controlled, the apparatus of each group being connected in parallel and each group being connected permanently to one of the two terminals of the main line, means to connect each of said balanced groups first in shunt with the end part of the device connected to the same terminal of the main line, then in shunt with this end and the intermediate parts of the device, finally in shunt between the two terminals of the line.

2. In combination with a main distributing line of substantially constant pressure,—a direct current pressure splitting device with two extreme and at least two intermediate symmetrical terminals, with means to maintain substantially constant the speed of said pressure splitting device disposed so as to symmetrically vary the pressures at the intermediate terminals with respect to the pressures applied to the extreme terminals of the device, and two balanced groups of electric apparatus to be controlled, the apparatus of each group being connected in parallel and each group being connected permanently to one of the two terminals of the main line, and means to connect each of said balanced groups first in shunt with the end part of the device connected to the same terminal of the main line, then in shunt with this end and the intermediate parts of the device, and finally in shunt between the two terminals of the line.

3. In combination with a main distributing line of substantially constant pressure,—a direct current pressure splitting device with two extreme and at least two intermediate symmetrical terminals, with means symmetrically disposed to vary the pressures at the intermediate terminals with respect to the pressures applied to the extreme terminals of said pressure splitting device, two balanced groups of electric series motors to be controlled, the motors of each group being connected in parallel and each group being connected permanently to one of the two terminals of the main line, means to connect each of these groups first in shunt with the end part of the device connected to the same terminals of the main line, then in shunt with this end and the intermediate parts of the device and finally in shunt between the two terminals of the line, an exciter mounted on the shaft of the pressure splitting device, and means for independently connecting said exciter to the fields of the two groups of motors whereby said motors may operate as generators for regenerative braking.

4. In combination with a main distributing line of substantially constant pressure,—a direct current pressure splitting device with two extreme and at least two intermediate symmetrical terminals, with means to maintain substantially constant the speed of said pressure splitting device disposed so as to symmetrically vary the pressures at the intermediate terminals with respect to the pressures applied to the extreme terminals of the device, two balanced groups of electric series motors to be controlled, the motors of each group being connected in parallel and each group being connected permanently to one of the two terminals of the main line, means to connect each of these groups first in shunt with the end part of the device connected to the same terminal of the main line, then in shunt with this end and the intermediate parts of the device and finally in shunt between the two terminals of the line, an exciter mounted on the shaft of the pressure splitting device, and means for independently connecting said exciter to the fields of the two groups of motors whereby said motors may operate as generators for regenerative braking.

5. In combination with a main distributing line, of substantially constant pressure,—a direct current pressure splitting device with two extreme and at least two intermediate symmetrical terminals, with means symmetrically disposed to vary the pressures at the intermediate terminals with respect to the pressures applied to the extreme terminals of said pressure splitting device,—two balanced groups of series wound motors to be controlled, the motors of each group being connected in parallel and each group being connected permanently to one of the two terminals of the main line, means to connect each of said motor groups first in shunt with the end part of the pressure splitting device connected to the same terminal of the main line, then in shunt with this end and the intermediate parts of the device, and finally in shunt between the two terminals of the line, an exciter mounted on the shaft of the pressure splitting device, field windings for each motor wound in two unequal parts and means to independently connect the larger of said field windings of each group to the exciter and to maintain the smaller field windings in series with the respective motor armatures whereby said motors may operate as generators for regenerative braking.

6. In combination with a main distributing line of substantially constant pressure,—a direct current pressure splitting device with two extreme and at least two intermediate symmetrical terminals, with means to maintain substantially constant the speed of said pressure splitting device disposed so as to symmetrically vary the pressures at the intermediate terminals with respect to the pressures applied to the extreme terminals of the device, two balanced groups of series wound motors to be controlled, the motors of each group being connected in parallel and each group being connected permanently to one of the two terminals of the main line, means to connect each of said motor groups first in shunt with the end part of the pressure splitting device connected to the same terminal of the main line, then in shunt with this end and the intermediate parts of the device, and finally in shunt between the two terminals of the line, an exciter mounted on the shaft of the pressure splitting device, field windings for each motor wound in two unequal parts and means to independently connect the larger of said field windings of each group to the exciter and to maintain the smaller field windings in series with the resepective motor armatures whereby said motors may operate as generators for regenerative braking.

In testimony whereof I affix my signature.

ANGELO DELLA RICCIA.